2,931,799
PROCESS FOR TREATING COBALAMIN ADSORBATES

Robert H. Sifferd, Joliet, Ill.

No Drawing. Application June 6, 1958
Serial No. 740,193

10 Claims. (Cl. 260—211.5)

This invention relates to a process for treating cobalamin adsorbates, and more particularly to chemical reactions of cobalamin adsorbates.

In the preparation of highly potent concentrates of vitamin $B_{12}$ (cyanocobalamin) from fermentation broths or from special extracts of organisms containing vitamin $B_{12}$-active materials, it has been found desirable to convert naturally occurring vitamin $B_{12}$ analogs into cyanocobalamin. (These "analogs" are understood to be substances identical with cyanocobalamin with the exception that the cyanide radical of cyanocobalamin is replaced by other acid anions or hydroxyl ion, the latter being the most commonly found analog in microorganisms or their culture media, or in mammalian liver extracts.)

Various procedures have been devised and described for converting these analogs, and particularly hydroxocobalamin, into cyanocobalamin. One of these is to incorporate an excess of inorganic cyanide ion into a solution of the native cobalamins, adjust the hydrogen ion concentration to the alkaline side (e.g., between pH 7.5 to pH 9), allowing the mixture to stand for a brief period, then readjusting the pH to the acid side for further treatment. Another method of treatment comprises adding an excess of cyanide ion and nitrite ion at about pH 4 to a solution of the vitamin $B_{12}$ analog and heating the mixture for several minutes at about 100° C. Another method comprises treating a vitamin $B_{12}$ analog composition with anhydrous liquid hydrogen cyanide.

In the foregoing processes, there are several serious disadvantages. In the processes employing a solution of the vitamin $B_{12}$ analog, purification steps are required for the removal of excess cyanide or other components of the cyaniding reagent. There is a substantial hazard in the handling of liquid hydrogen cyanide. Heat treatment for making the conversion on the acid side is an operation requiring additional equipment. The manipulation of vitamin $B_{12}$ in alkaline media tends to degrade the $B_{12}$ analog.

An object of my invention is to provide a process for treating cobalamin adsorbates in which the cobalamin analogs are converted to cyanocabalamin while avoiding the above described disadvantages and results. A further object is to provide a process in which the manipulation of vitamin $B_{12}$ in alkaline media tending to degrade the $B_{12}$ molecule is avoided, while also avoiding heat treatment for making the conversion on the acid side, requiring additional equipment. Yet another object is to provide a process for treating cobalamin adsorbates in which additional purification steps for the removal of excess cyanide or other components of a cyaniding reagent, as is required when the operation is carried on in solution, are eliminated. Yet another object is to provide such a process in which the handling of liquid hydrogen cyanide is avoided. Other specific objects and advantages will appear as the specification proceeds.

I have discovered a new and unexpected reaction by which cobalamin analogs are converted to cyanocobalamin. This reaction comprises treating an adsorbate of cobalamin analogs on a methacrylate carboxylic resin with a very dilute aqueous hydrogen cyanide dissolved in dilute aqueous mineral acid in the presence of a small quantity of an ether. That this conversion to cyanocobalamin is not due simply to contacting the adsorbate with cyanide ion per se is readily demonstrated by treating such an adsorbate with a like concentration of hydrogen cyanide and mineral acid in the absence of the ether component of the system. In such a non-ethereal system, certain of the vitamin $B_{12}$ analogs are converted from their original adsorbate form to another analog-adsorbate, as can be demonstrated by a change in color of the adsorbate, or by examination of the absorption spectrum of the eluted $B_{12}$ analog after the conversion.

In the case of column adsorbate of sulfitocobalamin, the characteristic brown or tan color of the resin-$B_{12}$ combination is gradually converted to a red or pink color by the passage of a solution of 0.02 N HCN in 0.1 N sulfuric acid, and the eluate from a column so treated has the color characteristic of either the sulfatocobalamin or hydroxocobalamin, with a spectrophotometric absorption maximum in the range of 354–356 mu.

In the case of a column adsorbate of hydroxocobalamin, treatment with the above-described hydrogen cyanide-sulfuric acid reagent produces no visible color change, and the eluate shows the same absorption spectrum as that of an eluate without the treatment with the cyanide-sulfuric reagent.

If, however, a small amount of an aqueous acid soluble ether is added to the above-mentioned cyanide-acid reagent, both the sulfitocobalamin adsorbate and the hydroxocobalamin adsorbate are changed to a violet color which persists as long as the ether-cyanide-acid reagent is in contact. If the reagent is displaced from the column with dilute aqueous mineral acid (e.g., N/10 sulfuric or hydrochloric acid), the violet color gradually changes to a pink or red color characteristic of cyanocobalamin, and the eluate of such a preparation shows the characteristic absorption maxima corresponding to cyanocobalamin, with its strongest characteristic maximum of 361 mu.

In general, I prefer to use a concentation of the ether in the range of 3% to 10% by volume in the cyaniding reagent employed. As one decreases the proportion of the ether component below about 5%, the degree of conversion of the analog to cyanocobalamin decreases. Substantially complete conversion to the cyano compound occurs if the ether component is present at a 5% level, however.

Owing to the solubility characteristics of the various ethers which are commercially available, the choice of these compounds for the purpose described is necessarily somewhat limited. While diethyl ether may be used, I prefer the use of the cyclic ethers, such as tetrahydrofuran or dioxan, both of which are sufficiently volatile to permit easy recovery if desired. However, the various glycol ethers, such as the "Cellosolve" compounds or the "Dowanols," may be used.

It should be pointed out that the above-described ether-cyanide-acid reagent does not convert the $B_{12}$ analogs to cyanocobalamin in solution in the absence of the carboxylic resin. A solution of sulfitocobalamin, for example, made to 0.02 N HCN, 0.1 N sulfuric acid and 5% dioxan, shows no color change in comparison with a sulfitocobalamin solution of the same concentration without the reagent. However, if a small quantity of moist carboxylic resin is added, the color of the resin and the supernatant solution turns to a violet pink, indicating the conversion of the sulfino analog to the cyano compound.

In the operation of my process as described above for converting a vitamin $B_{12}$ analog to cyanocobalamin, the vitamin $B_{12}$ analog is adsorbed upon a methacrylate carboxylic resin and the adsorbate is contacted with a reagent consisting of a water-soluble ether and aqueous acid, preferably mineral acid, containing hydrogen cyanide, to convert the same to a cyanocobalamin adsorbate, and then recovering the adsorbate. The adsorbate may be removed and dried. If desired, the adsorbate may be eluted with any suitable eluting agent, such as, for example, aqueous alkali, or an acid eluting agent containing a polar solvent, or any other of the well-known eluting agents. Instead of obtaining a hydroxocobalamin adsorbate, and treating the same as described above, the adsorbed material on the methacrylate carboxylic resin in the first above-described step may be washed with dilute sulfurous acid to form a sulfitocobalamin adsorbate. The sulfitocobalamin adsorbate possesses the advantage of being more stable. This adsorbate may be then contacted with the aqueous mineral acid containing hydrogen cyanide and with a water-soluble ether to convert the same to cyanocobalamin. In the foregoing operation, it is preferred to convert the adsorbate to the cyanocobalamin adsorbate in situ.

A further variation in the process involves the conversion step described in which sulfurous acid is employed for the conversion in situ of the hydroxo adsorbate to sulfitocobalamin adsorbate, and then contacting the adsorbate with aqueous acid containing hydrogen cyanide to convert the same to sulfatocobalamin adsorbate. I then add ether and aqueous acid containing cyanide to form cyanocobalamin adsorbate and recover the cyanocobalamin.

The practical conversion of different cobalamin analogs to cyanocobalamin is illustrated in the following examples:

Example 1

A glass column one-half inch in diameter is prepared with a glass wool filter pad at the bottom and is filled with a suspension of finely-divided methacrylate carboxylic resin (Amberlite XE97) in aqueous sulfuric acid at pH 1.5. The resin is collected in the column on the filter pad until a resin bed depth of about four inches is obtained. The excess liquid is drained off, and the wet resin contacted by downflow with 50 ml. portion of an aqueous extract of dried activated sewage sludge, the extract by previous analysis having been ascertained to contain 3.1 mcg. vitamin $B_{12}$ activity per ml. (expressed as cyanocobalamin). After passage of the extract, the column contents are washed by downflow of 25 ml. 0.1 N sulfuric acid to displace unadsorbed material. To the column is added 5 ml. of an aqueous solution containing 0.25 ml. dioxan, 6.5 mg. potassium cyanide, and 147 mg. $H_2SO_4$. After passage of the reagent into the resin, the column contents are washed successively by downflow with 20 ml. 0.1 N sulfuric acid, 5 ml. 85% aqueous acetone, 20 ml. 0.1 N sulfuric acid. The adsorbed vitamin $B_{12}$ is then eluted from the resin by downflow of an acidified 60% aqueous dioxan solution. The eluate is found by spectrophotometric analysis to contain 153 mcg. of vitamin $B_{12}$ activity. The absorption spectrum shows a maximum at 361 mu, characteristic of cyanocobalamin.

Another column prepared and treated in the same manner, but with the 0.25 ml. portion of dioxan omitted from the cyanide reagent, gave an eluate with an absorption spectrum maximum at 356 mu.

Example 2

A column fourteen inches in diameter and containing 22 liters of wet methacrylate carboxylic resin (Amberlite XE97) in the acid state is treated by downflow passage of 100 liters of a crude sulfitocobalamin aqueous solution containing 65 mg. vitamin $B_{12}$ activity per liter. After passage of the solution, the column contents are flushed with 80 liters of 0.1 N $H_2SO_4$. The column outlet is closed and the column contents agitated for 15 minutes with a mixture of 1.65 liters dioxan, 43 gm. potassium cyanide, and 9 liters of water containing 50 gm. $H_2SO_4$. The column outlet is then opened, the liquid drained, and the column contents washed with 20 liters 0.1 N $H_2SO_4$. The adsorbed cyanocobalamin is eluted by downflow of 25 liters of a solution of 30% aqueous tetrahydrofuran containing 125 gm. $H_2SO_4$. The eluate is found to contain 6.1 gm. of cyanocobalamin by spectrophotometric analysis, and the product an absorption maximum at a wavelength of 361 mu.

Example 3

The column described in Example 2 is treated identically with the exception that 1.65 liters of tetrahydrofuran is used in place of 1.65 liters of dioxan. The eluate is found to contain 6.02 gm. cyanocobalamin.

Example 4

A column six inches in diameter, packed with methacrylate carboxylic resin (Amberlite IRC50) to a depth of 5 feet, is treated by downflow with 500 gallons of an aqueous extract of dried activated sewage sludge, the extract containing 17 mg. vitamin $B_{12}$ activity per gallon. The resin and adsorbate are washed in the column with 100 gallons of water containing one pound anhydrous sodium sulfite and four pounds 66° Bé. sulfuric acid, then with 25 gallons of water containing one pound sulfuric acid. The resin is then contacted by slow downflow with 8 gallons of an aqueous solution containing 40 gm. potassium cyanide, 175 gm. 66° Bé. sulfuric acid and 0.8 gallons dioxan. The column is then washed with 25 gallons of 0.1 N sulfuric acid and eluted by the slow passage of 35 gallons of 2% aqueous ammonium hydroxide. The alkaline eluate is found to contain 6.5 gm. cyanocobalamin.

Example 5

As in Example 1 with the exception that the cyaniding reagent contains 0.5 ml. methyl Cellosolve in place of 0.25 ml. dioxan.

Example 6

As in Example 1 with the exception that the cyaniding reagent contains 0.5 ml. butyl Cellosolve in place of 0.25 ml. dioxan.

While in the foregoing specification, I have set forth specific procedures in considerable detail for the purpose of illustrating the invention, it will be understood that such details of procedure may be varied widely by those skilled in the art without departing from the spirit of my invention.

I claim:

1. In a process for converting vitamin $B_{12}$ analogs to cyanocobolamin, the steps of adsorbing a vitamin $B_{12}$ analog upon a methacrylate carboxylic resin, contacting the adsorbate with a reagent comprising a water-soluble ether in an amount of at least 3% and aqueous acid containing hydrogen cyanide at a pH not in excess of 4 to convert the same to a cyanocobalamin adsorbate, washing out the excess cyanide, and recovering the adsorbate.

2. In a process for converting vitamin $B_{12}$ analogs to cyanocobalamin, the steps of adsorbing at a pH below 7 a vitamin $B_{12}$ analog upon a methacrylate carboxylic resin to obtain a hydroxocobalamin adsorbate, contacting the adsorbate with a reagent comprising a water-soluble ether in an amount of at least 3% and aqueous mineral acid containing hydrogen cyanide at a pH not in excess of 4 to convert the same in situ to cyanocobalamin adsorbate, washing out the excess cyanide, and recovering the adsorbate.

3. The process of claim 2 in which the cyanocobalamin adsorbate is eluated with an eluting agent and the cyanocobalamin dried.

4. In a process for converting a vitamin $B_{12}$ analog to cyanocobalamin, the steps of adsorbing a vitamin $B_{12}$ analog upon a methacrylate carboxylic resin, washing the adsorbate with dilute sulfurous acid to form a sulfitocobalamin adsorbate, contacting the sulfitocobalamin adsorbate with a water-soluble ether in an amount of at least 3% and an aqueous acid containing hydrogen cyanide at a pH not in excess of 4 to convert the same to cyanocobalamin adsorbate, washing out the excess cyanide, and recovering the adsorbate.

5. The process of claim 4 in which the conversion steps are carried out upon the adsorbates in situ.

6. In a process for converting a vitamin $B_{12}$ analog to cyanocobalamin, the steps of adsorbing a vitamin $B_{12}$ analog upon a methacrylate carboxylic resin, washing the adsorbate with sulfurous acid in situ to convert the same to sulfitocobalamin adsorbate, contacting the sulfitocobalamin adsorbate with aqueous acid containing hydrogen cyanide to convert the adsorbate to sulfatocobalamin adsorbate, adding ether in an amount of at least 3% and aqueous acid containing cyanide thereto at a pH not in excess of 4 to convert the adsorbate to cyanocobalamin adsorbate, and drying the cyanocobalamin product.

7. In a process for converting vitamin $B_{12}$ analogs to cyanocobalamin, the steps of adsorbing at an acid pH a vitamin $B_{12}$ analog upon a methacrylate carboxylic resin, contacting the adsorbate with a reagent comprising a water-soluble ether in an amount of at least 3% and aqueous mineral acid containing hydrogen cyanide at a pH not in excess of 4 to convert the adsorbate to cyanocobalamin adsorbate in situ, washing out the excess cyanide, and drying the cyanocobalamin.

8. The process of claim 1 in which the water-soluble ether is a cyclic ether.

9. The process of claim 7 in which the water-soluble ether is tetrahydrofuran.

10. The process of claim 7 in which the water-soluble ether is dioxan.

References Cited in the file of this patent

UNITED STATES PATENTS

| 2,530,416 | Wolf | Nov. 21, 1950 |
| 2,830,933 | Bouchard et al. | Apr. 15, 1958 |

FOREIGN PATENTS

| 730,173 | Great Britain | May 18, 1955 |